United States Patent [19]

Hanna

[11] Patent Number: 4,786,786

[45] Date of Patent: Nov. 22, 1988

[54] METHOD AND BUFFERING DEVICE FOR HIGHLIGHTING DOCUMENTS IN A POCKET

[75] Inventor: Peter D. Hanna, Waterloo, Canada

[73] Assignee: NCR Corporation, Dayton, Ohio

[21] Appl. No.: 126,318

[22] Filed: Nov. 30, 1987

[51] Int. Cl.[4] .................. G06F 15/30
[52] U.S. Cl. .................. 235/379
[58] Field of Search .................. 235/379

[56] References Cited

U.S. PATENT DOCUMENTS 4,697,071 9/1987 Hiraoka .................. 235/379

*Primary Examiner*—Harold I. Pitts
*Attorney, Agent, or Firm*—Wilbert Hawk, Jr.; Albert L. Sessler, Jr.; Elmer Wargo

[57] ABSTRACT

A method and apparatus for highlighting certain documents being fed into a pocket from the rest of the documents which are already in the pocket. A pocket marker which is moveable between first and second positions relative to documents in the pocket is used to highlight or separate those documents which are associated with a transaction to be proven, for example, from those documents which are associated with transactions which have already been proven when the apparatus is used in an encoder business machine.

21 Claims, 6 Drawing Sheets

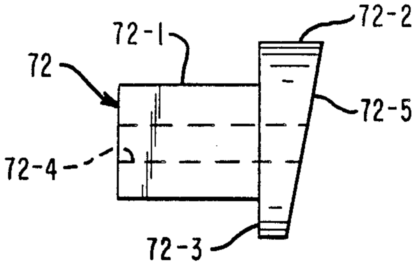
FIG. 8
FIG. 9
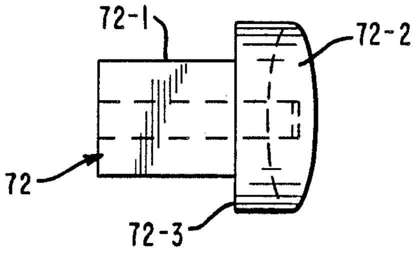
FIG. 10
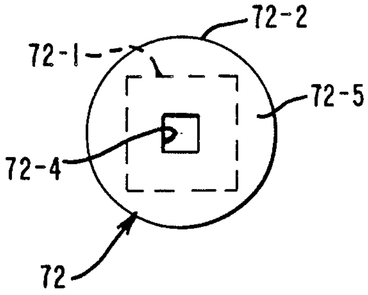
FIG. 11
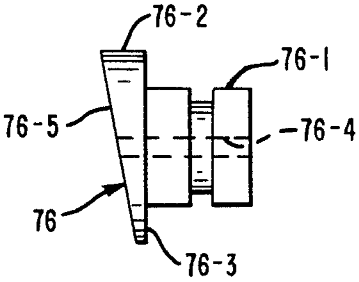
FIG. 12
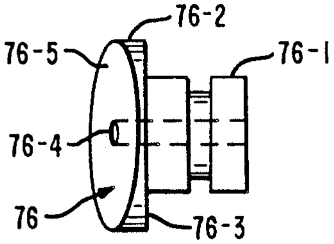
FIG. 13
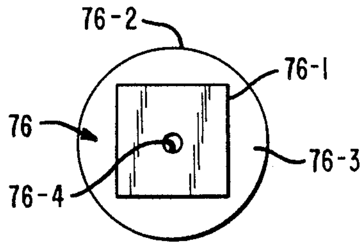

METHOD AND BUFFERING DEVICE FOR HIGHLIGHTING DOCUMENTS IN A POCKET

BACKGROUND OF THE INVENTION

This invention relates to a method and a pocket buffering device which are useful in highlighting certain documents being fed into a pocket from the rest of the documents which are already stacked in the pocket.

One of the early operations in the processing of financial documents at financial institutions, like banks, is referred to as "over-the counter" work. In a typical operation, an operator uses a machine which is referred to as an encoder to match or prove the monetary amount on a deposit slip with the total monetary amount of the checks associated with that transaction and to encode or print the monetary amount in MICR ink on the associated checks. For example, a deposit slip lists three checks whose total value is equal to $25.00, and the three checks associated with this transaction have monetary amounts of $10.00, $10.00, and $5.00. To process this transaction, the operator first enters the total amount of $25.00 from the deposit slip on a keyboard associated with the encoder. This amount is then encoded in MICR ink on the deposit slip, and the slip is then moved along a document track to a pocket associated with the encoder. Thereafter, the operator reads the monetary amount on the first check, $10.00 in the example being described, and enters this amount on the keyboard. This amount is then encoded in MICR ink in the amount field under the signature line on the associated check, and the check is then moved along a document track to the pocket. If this is not the first transaction, there will be other documents formed into a stack in the pocket as received from prior transactions. This process is repeated for the remaining checks in the transaction being described. Each time a check is entered, the monetary amount of that check is subtracted from the total monetary amount entered for the deposit slip so that when the last check is entered, the balance in the machine should be $0.00. This balance of $0.00 indicates that the operator has entered this transaction correctly and that the deposit slip listing of the items is correct; consequently, the operator may proceed to the next transaction.

The process just described for a single transaction is repeated for the remaining transactions, including deposit slips and their associated checks as in the example being described. For some transactions, a single deposit slip may have only one check or 100 or more checks associated with it. A recent study indicated that, on average, there are eight checks per deposit slip.

Suppose that an operator makes a mistake in entering the monetary amount of a check in the process being described or that the deposit slip does not contain an accurate listing of the associated checks; the mistake would be indicated by not obtaining a $0.00 balance at the end of the transaction. An important point to be made here is that the monetary amounts which are encoded on the deposit slips and the checks in MICR ink are used in high speed processing by the receiving bank and by the rest of the banking industry, so it is very important that these monetary amounts are correct. When an error occurs in a transaction, the operator looks at the printer tape, for example, associated with the machine to find out how many checks were associated with this transaction. Suppose that ten checks were associated with the deposit slip for this last transaction. To find the error, the operator has to reach over to the stack of documents in the pocket of the machine and physically lift out the entire stack of documents or at least enough of the stack to include the ten checks and the deposit slip associated with the transaction out of balance. With these documents in front of him or her, the operator then must find and separate the unbalanced documents from the others before attempting to find the error and return the remainder to the pocket, The operator then reviews the individual documents to find the error. The error may have been due to the opeator entering the wrong amount on the check, for example. This means that the amount of the check which has been encoded in MICR ink has to be changed. This is accomplished in any conventional way, such as by covering the incorrect encoded amount with a correction sticker, entering the correct amount on the keyboard of the machine, and thereafter, passing the check past the encoder to print the correct amount on the affected check. When the operator is satisfied that the transaction is now correct, the operator returns the corrected documents to the pocket in the correct order. Isolating the last deposit slip and separating the proven and unproven documents before error correction can begin is a time consuming job.

SUMMARY OF THE INVENTION

In contrast with the prior-art method just described, the present invention provides a buffering device which highlights or buffers those documents associated with a transaction which is unproven from those documents associated with transactions which have been proven.

A preferred embodiment of this invention relates to a machine comprising: a pocket for receiving documents processed by said machine; processing means for processing said documents in accordance with predetermined criteria; moving means for moving documents processed by said processing means into said pocket; and highlighting means for highlighting certain of said documents moved into said pocket in accordance with said predetrrmined criteria so as to facilitate the removal of said certain of said documents.

In another aspect, a preferred embodiment of this invention relates to a pocket buffering device which includes: a pocket for receiving documents to be pocketed; said pocket having a side wall, an end wall, and a moveable wall which is biased for movement towards said side wall and which is moved away from said side wall by documents being moved into said pocket to form an increasing stack of documents deposited in said pocket; moving means for moving documents into said pocket to abut against said end wall to form said stack; highlighting means for highlighting those of said documents which have been moved into said pocket after a control signal has been generated; and means for generating said control signal.

In another aspect, this invention relates to a method of highlighting documents being moved into a pocket to form a stack of documents therein comprising the steps: (a) moving documents associated with a transaction into said pocket; (b) determining whether or not the documents associated with said transaction meet predetermined criteria; (c) generating a control signal when the documents associated with said transaction meet said predetermined criteria; (d) using said control signal to effect a highlighting in said pocket of documents associated with the next transaction to be evaluated in step b so as to facilitate the grasping of documents in said pocket in the event that this next transaction does not meet said predetermined criteria.

An advantage of this invention is that it facilitates the correction procedure described earlier herein by isolating the documents for an unproven transaction from the documents associated with proven transactions.

Another advantage is that every time the documents associated with a transaction are proven or balanced, a control signal is generated which causes a "separator or marker", so to speak, to be placed at the end of the stack of documents to separate the documents of this just-proven transaction from the documents associated with a next transaction to be proven.

These advantages, and others, will be more readily understood in connection with the following description, claims, and drawing.

BRIEF DESCRIPTION OF THE DRAWING

FIG. 8 is an elevational view of a sliding cam on which the pocket marker is located as seen from the position shown in FIG. 3;

FIG. 9 is a plan view of the cam shown in FIG. 8 as seen from the position shown in FIG. 2;

FIG. 10 is an end view of the cam shown in FIGS. 8 and 9;

FIG. 11 is a plan view of a stationary cam which cooperates with the sliding cam shown in FIGS. 8–10 to move the pocket marker between the positions shown in FIGS. 2 and 4; this view is presented as seen from FIG. 2;

FIG. 12 is an elevational view of the stationary cam shown in FIG. 11; this view is presented as seen from FIG. 3;

FIG. 13 is an end view of the cam shown in FIGS. 11 and 12; and

DETAILED DESCRIPTION OF THE INVENTION

Figure 1:
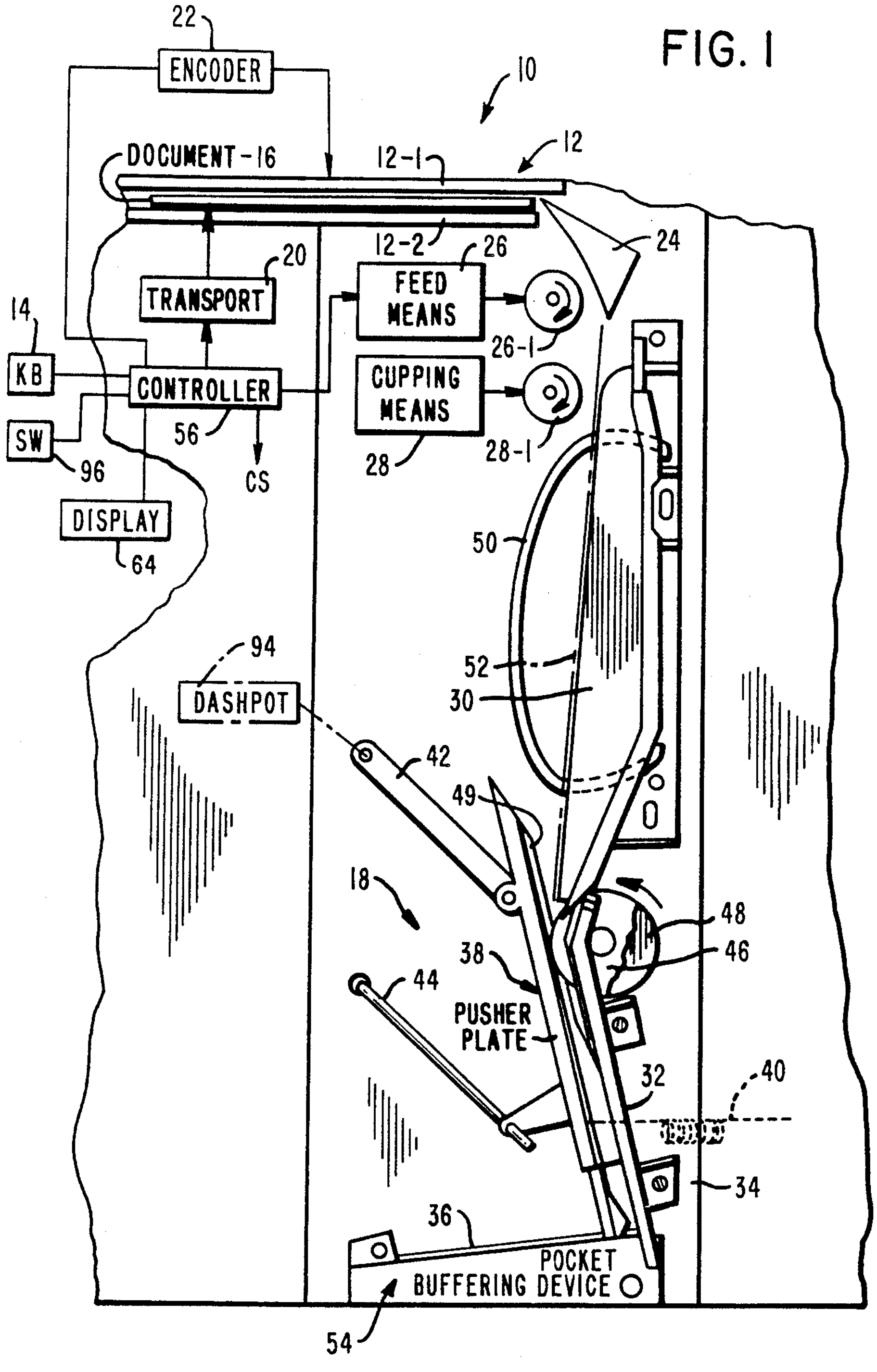
FIG. 1 is a general plan view of the pocket area of a financial business machine, like an encoder, in which the pocket buffering device of this invention may be used.

Before discussing the details of this invention, it seems appropriate to show how it fits into a financial business machine, like the encoder mentioned earlier herein. In this regard, FIG. 1 is a plan view of an encoder machine which is designated generally as encoder 10. For the "over-the counter" work mentioned earlier herein, the encoder 10 has a document track 12 which is comprised of vertically-upstanding walls 12-1 and 12-2 to receive the documents which are to be encoded and balanced or proven. An operator enters the amount of a deposit slip on a key board (KB) 14 associated with the controller 56, which controls the operations of the encoder 10, and thereafter, the operator drops the document into the document track 12.

A document, like document 16, is moved from the document track 12 to the pocket (designated generally as 18) of the encoder 10 (FIG. 1) in the following manner. A conventional transport 20, including rollers and associated pinch rollers (not shown), is used to move the document 16 into operative relationship with the printer or encoder 22 which prints or encodes the monetary amount of the document 16 on the document itself. This monetary amount is the amount which the operator entered on the KB 14 prior to dropping the document 16 into the document track 12. The monetary amount of the document 16 is printed in MICR ink, and the location of the printing is under the signature line of a check, for example.

After the encoding as described, the document 16 is moved further along the document track 12 to a point where it is deflected by a deflector 24 towards the pocket 18. Additional feed means 26 including drive rollers 26-1 and also including a cupping means 28 are used to move the document 16 towards the pocket 18. The cupping means 28 provides some rigidity to the document 16 as it is driven into the pocket 18 by putting a concave-convex bend in the document along the length thereof. A pair of spaced rollers 28-1 and a generally horizontally-positioned rib 30 combine, conventionally, to produce the cupping of the document 16.

The pocket 18 (FIG. 1) includes the following elements. A stationary side wall 32 is upstanding from and is secured to the floor 34 of the pocket 18 to provide one side for the pocket 18. As the documents are fed into the pocket 18, they abut against the stationary end wall 36. To accommodate an increasing stack of documents, in the pocket 18, a moveable wall or pusher plate 38 is resiliently biased towards the side wall 32 by a spring 40. The pusher plate 38 is mounted for parallel movement relative to the side wall 32 by a conventional four bar linkage including links 42 and 44. A pair of spaced parallel drive rollers 46 and 48 and a rib 49, positioned therebetween, are used to drive the documents, like 16, into the pocket 18. As documents, like 16, are moved into the pocket 18, their trailing edges tend to fan out and interfere with the leading edge of the next document being fed into the pocket 18. To overcome this problem, the encoder 10 also includes a thin plastic band 50 (exaggerated in size in FIG. 1) which engages the leading edge of a document, like 16, and produces a "travelling wave" which pushes aside the trailing edges of the documents already in the pocket 18 to provide an entry path for the document, like 16, being fed into the pocket 18. The centerline 52 shows the path that a document 16 follows in being moved into the pocket 18. The most recent document, like 16, fed into the pocket 18 is positioned next to the stationary side wall 32.

Having described, generally, the basic elements of a business machine, like the encoder 10, it seems appropriate to discuss how the pocket buffering device designated generally as 54 and shown only in diagrammatic form in FIG. 1 is used. The pocket buffering device, hereinafter referred to as device 54, is positioned adjacent to the end wall 36 of the pocket 18. As stated earlier herein, the device 54 buffers those documents associated with a transaction which is unproven from those documents associated with transactions which are proven. Conventional predetermined criteria may be used to determine whether or not the documents associated with a transaction have been proven.

To review, briefly, the balancing operation described previously in the Background Of The Invention, it should be recalled that an operator enters the total monetary amount on a deposit slip on the KB 14, and thereafter, the operator hand drops the deposit slip into the document track 12. From there, the deposit slip, like document 16, is moved past the encoder 22 which prints the total monetary amount in MICR ink on the deposit slip, and thereafter, the deposit slip is moved into the pocket 18. The operator then enters the monetary amount of the first check which was associated with the transaction involving the deposit slip mentioned, and thereafter, this first check is dropped into the document track 12. Again, from there, the first check, like document 16, is moved past the encoder 22 which prints the monetary amount of the check in MICR ink on the check under the signature line thereof. From the encoder 22, the first check is moved into the pocket 18. Using the example described in the Background, if the deposit slip had a total monetary value of $25.00 thereon, the amount of the first check mentioned in this paragraph, which is $10.00, would be subtracted from the total, leaving a balance of $15.00. The next two checks in the example being described would be similarly processed, and if the checks are properly read and processed, the resulting balance would be $0.00. This would indicate that the transaction involving the three checks and the deposit slip would be balanced or "proven". These transactions are handled, conventionally, by the controller 56 which has the usual hardware and software to enable it to function as an intelligent terminal or business machine.

At the completion of a proven transaction like the one described in the previous paragraph, the controller 56 issues a control signal (CS) which is used by the device 54. The CS signal is timed to be generated after the last document, like 16, in a balanced transaction has reached the pocket 18. The general function of the CS signal is to actuate the device 54 so that it no longer buffers those documents associated with the last transaction, but includes them with the growing stack of the documents in the pocket 18 which are associated with previous proven transactions. After this, the device returns to its home position from which it highlights, buffers, or separates the documents associated with the next transaction being proved or balanced.

Figure 2:
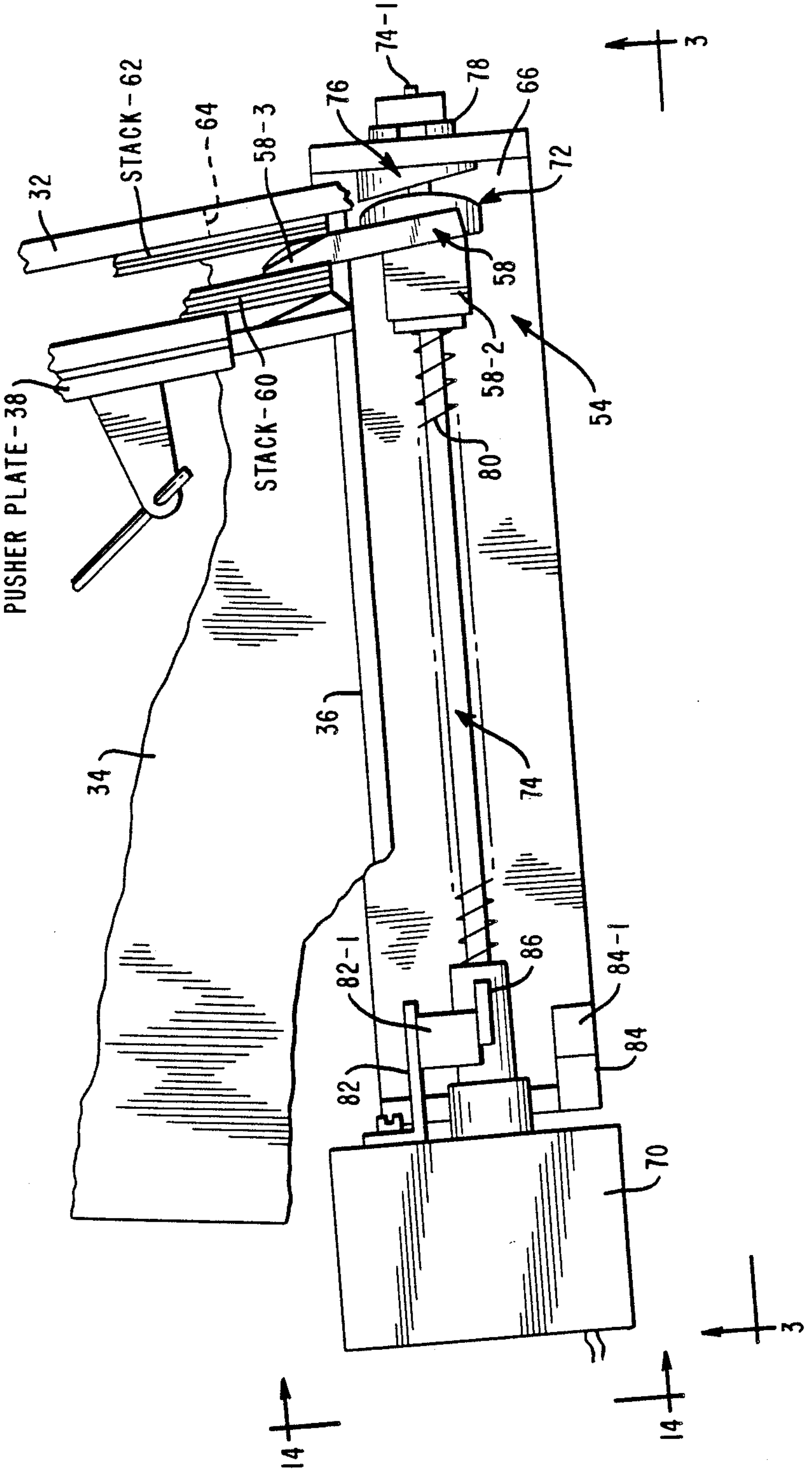
FIG. 2 is a plan view of a portion of the encoder shown in FIG. 1, showing additional details of the pocket buffering device shown only schematically in FIG. 1, and also showing a pocket marker or buffer in the home position to separate the documents associated with proven transactions from the documents associated with a transaction being proven.

FIG. 2 shows a plan view of the device 54 shown only schematically in FIG. 1. In a preferred embodiment, the device 54 includes a means for highlighting those documents which are associated with a particular transaction which is currently in the process of being proven or balanced, or was found to be out of balance as described herein. Another way of looking at the device 54 is that it facilitates grasping only those documents in the pocket 18 which are associated with a transaction which is currently in the process of being proven or balanced, or was found to be out of balance.

FIG. 2 is a plan view of a portion of the encoder shown in FIG. 1, showing additional details of the pocket buffering device 54 shown only schematically in FIG. 1, and also showing a buffer or pocket marker 58 in the home position to separate the documents associated with proven transactions from the documents associated with a transaction being proven. In this regard, the documents in the stack 60 which are located to the left of the pocket marker 58 are for proven transactions, and the douments in the stack 62 which are located to the right of the pocket marker 58 (as viewed in FIG. 2) are associated with the transaction currently being proven. As documents, like 16, associated with a current transaction are fed into the pocket 18 as previously described, they are deflected by the pocket marker 58 to collect in stack 62. Assume for the moment that the transaction associated with these documents did not balance or did not equal $0.00 in the example previously described in whch a deposit slip of $25.00 and three checks totalling this amount were used. Because this transaction did not balance, the controller 56 would not issue the control signal CS, but it would issue an out of balance indication to the operator via a display 64, for example.

When an out of balance indication is encountered, the operator has to find the error or errors which caused it. With the pocket buffering device 54, the operator simply reaches to the pocket 18 and lifts out the documents which are located in stack 62 which is located to the right of the pocket marker 58. The operator does not need to look at the pocket 18 in order to pick out the documents associated with an out of balance transaction; this is an advantage in speeding up the proving transaction. Also, the deposit slip or "credit" document is located immediately to the right (as viewed in FIG. 2) of the pocket marker 58, with the checks for the associated transaction following; this facilitates finding the error.

When a transaction is proven as earlier described herein, the controller issues the control signal CS; however, the pocket buffering device 36 is not actuated until the next document associated with the next transaction to be proved is moved along the document track to the encoder 22, for example. This is handled conventionally by the controller's firmware, for example, and is done to make sure that all documents associated with a prior transaction are in fact moved into the pocket 18 prior to having documents associated with the next transaction being moved into the pocket 18. It is also done from a safety standpoint to make sure that the operator's hands are out of the pocket 18.

When the pocket buffering device 54 is actuated, the pocket marker 58 is moved out of the pocket 18, permitting the documents which are in the stack 62 (FIG. 2) to become part of the stack 60 which includes the documents for proven transactions. This is accomplished by having the pusher plate 38 move towards the side wall 32, causing the documents in stack 62 to become part of stack 60; it should be recalled that the pusher plate 38 is biased towards the side wall 32 by the spring 40 shown in FIG. 1.

Figure 4:
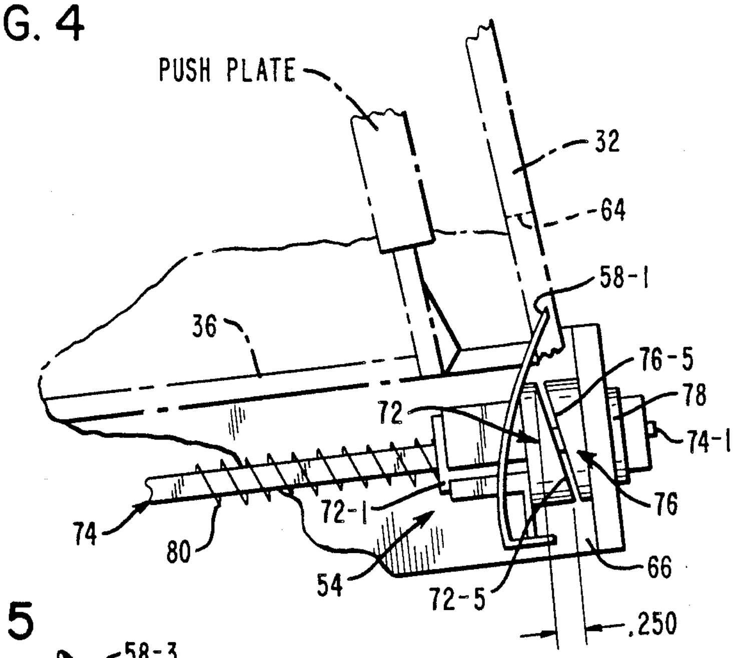
FIG. 4 is a view similar to FIG. 2, and the view is used to show the pocket marker in an inactive position.

When the pocket marker 58 is moved to the inactive position shown in FIG. 4 from the active position shown in FIG. 2, it moves out of engagement with the documents in the pocket 18. However, the lower end 58-1 of the pocket marker 58 becomes positioned in a recess 64 in the side wall 32 so as to be positioned to the extreme right (as viewed in FIG. 4) of that document which is adjacent to the side wall 32. This positioning enables the pocket marker 58 to move all documents in the pocket 18 to the left, as will be described herein, when the pocket marker 58 returns to the home position shown in FIG. 2 from the inactive position shown in FIG. 4. When the pocket marker 58 moves to the active position shown in FIG. 2, it moves the documents in stack 62 towards the documents in stack 60, in the example being described, to make the stack 62 larger. Also, the pocket marker 58 abuts against the last document in the increased stack 60, and it is in a position to deflect the next incoming documents to the right of the pocket marker 58, with these next documents being associated with a new transaction to be balanced.

Some additional details of the pocket buffering device 54 are as follows. The pocket buffering device 54 (hereinafter referred to as device 54) is positioned next to the end wall 36 as shown in FIGS. 1 and 2, for example. The device 54 is supported by a generally "U"-shaped member 66 which is spaced from the floor 34 of the pocket 18 by a spacer 68 and is secured to the floor 34 by suitable fasteners (not shown). A rotary solenoid 70 is supported on one side of the member 66, and the solenoid 70 is used to rotate the pocket marker 58 through about 90 degrees from the position shown in FIG. 2 to the position shown in FIG. 4 whenever the device 54 is actuated. When the rotary solenoid 70 is de-energized, a spring (not shown) within the solenoid returns the pocket marker 58 to the active or home position shown in FIG. 2.

Figure 5:
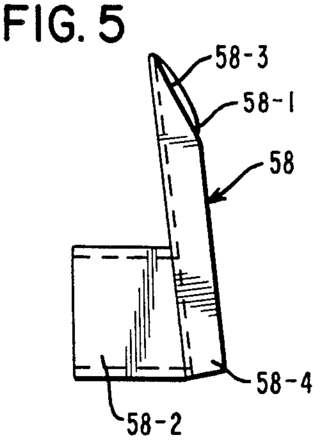
FIG. 5 is a plan view of the pocket marker shown in FIG. 2.
Figure 6:
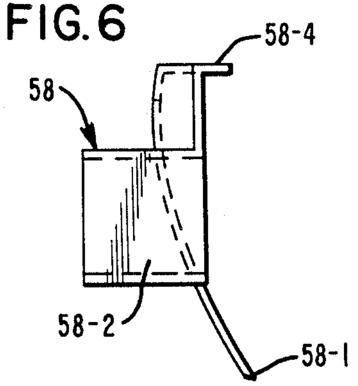
FIG. 6 is an elevational view of the pocket marker shown in FIG. 2.
Figure 7:
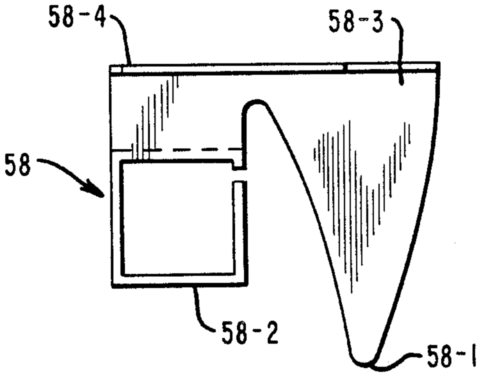
FIG. 7 is an end view of the pocket marker shown in FIG. 2.

The details of the pocket marker 58 are shown in FIGS. 5, 6, and 7. The pocket marker 58 has a square tubular section 58-2 which enables it to be mounted on a mating square section 72-1 of a moveable cam designated generally as 72 and shown in detail in FIGS. 8-10. The pocket marker 58 is made of rigid material, like metal, and it has a tapered or deflector portion 58-3 which is used to deflect documents to the right, as viewed in FIG. 2. In a typical situation, the left side of the pocket marker 58 abuts against the documents in stack 60 for balanced transactions, and the lower end 58-1 of the pocket marker 58 extends towards the right, as viewed in FIG. 2, to perform two functions. The first function is to move the lower ends of documents towards the right, as viewed in FIG. 2, to form the separate stack 62. The second function of the lower end 58-1 is to move into the recess 64 when the pocket marker 58 is in the inactive position shown in FIG. 4 so that the pocket marker 58 is in a position to move all the documents in the stack 62 to the left when the pocket marker returns to the home position shown in FIG. 2. The deflector portion 58-3 is formed on an offset portion 58-4 shown best in FIG. 6.

The pocket marker 58 is mounted on the moveable cam 72 for movement therewith. The details of the moveable cam 72 are shown in FIGS. 8, 9, and 10. The cam 72 has a cylindrical section 72-2 whose diameter is larger than a side of the square section 72-1 to produce the shoulder 72-3 against which the square tubular section 58-2 abuts. The cam 72 also has a square hole 72-4 therein which is axially aligned with the axis of the cylindrical section 72-2; the square hole 72-4 enables the cam 72 with the pocket marker 58 thereon to slide along the square shaft 74 for reasons to be later described herein.

The moveable cam 72, just described, coacts with a stationary cam 76 to provide the movement of the pocket marker 58 between the positions shown in FIGS. 2 and 4. The stationary cam 76 has a square section 76-1 and a cylindrical section 76-2 which form a shoulder at 76-3 as shown in FIGS. 11, 12, and 13. The cam 72 has a round hole 76-4 therein which is concentric with the longitudinal axis of the cylindrical section 76-2. The square shaft 74 has a round end 74-1 on one end thereof to enable the shaft 74 to rotate relative to the stationary cam 76 while the remaining portion of the shaft 74 provides a driving or rotating connection with the moveable cam 72 (and the pocket marker 58 thereon) while enabling this cam to move axially along the length of the shaft 74. The stationary cam 76 has a planar angular face 76-5 or working surface which cooperates with a planar angular face 72-5 located on the moveable cam 72. When the pocket marker 58 is in the position shown in FIG. 4, the faces 72-5 and 76-5 are parallel and contacting each other, although for ease of illustration, these faces are shown in FIG. 4 as being spaced slightly apart. The angles that the faces 72-5 and 76-5 make with respect to the longitudinal axis of the square shaft 74 are such as to provide a displacement of 0.25 inch, as measured along the length of the shaft 74 in the embodiment described, when the pocket marker 58 is rotated through an angle of about 90 degrees in moving from the position shown in FIG. 4 to the position shown in FIG. 2. An additional one eighth inch of displacement or camming action for moving the documents to the left, as viewed in FIG. 2, is obtained by the lower end 58-1 of the pocket marker 58 being displaced to the right, as shown in FIG. 6, making the total displacement or camming action about three eighths of an inch.

The square shaft 74 is mounted in the encoder 10 as follows. First, the square end 76-1 of the stationary cam 76 is mounted in a mating recess in the "U"-shaped member 66 (FIG. 2) and a locking clip 78 is used to secure the cam 76 to the "U"-shaped member 66. The square tubular section 58-2 of the pocket marker 58 is then mounted on the square section 72-1 of the moveable cam 72. After that, the cam 72 with the pocket marker 58 thereon is slid on the square shaft 74, and the round end 74-1 of the square shaft 74 is mounted in the mating hole 76-4 of the stationary cam 76. Thereafter, a compression type spring 80 is moved on the shaft 74, with one end of the spring abutting against the moveable cam 72. The remaining end of the square shaft 74 is coupled to the output member of the rotary solenoid 70, and the solenoid 70 is secured to the "U"-shaped member 66 so that when the solenoid 70 is energized, it moves or rotates the pocket marker 58 through the 90 degree rotation from the position shown in FIG. 2 to the position shown in FIG. 4. After the solenoid 70 is deenergized, a spring within the solenoid is used to return the pocket marker 58 to the position shown in FIG. 2.

Figure 3:
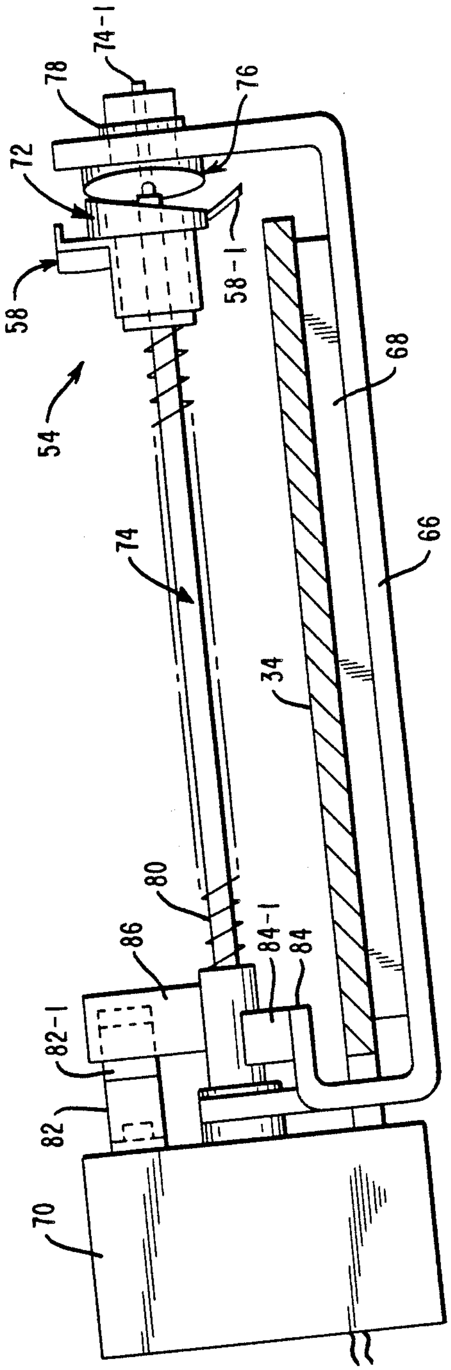
FIG. 3 is an elevational view taken along the line 3—3 of FIG. 2 to show additional details of the pocket buffering device.

The square shaft 74 is constrained to move within the approximate 90 degree rotation mentioned by stops 82 and 84 which cooperate with a finger 86 which extends from the shaft 74 as shown in FIGS. 2 and 3. The stop 82 is generally "L"-shaped and is secured to the rotary solenoid 70. The stop 84 is produced by a bent over finger which extends from the "U"-shaped member 66. The stops 82 and 84 have elastomeric pads 82-1 and 84-1, respectively, thereon to provide some cushioning at the extremes of the rotation of the shaft 74.

Figure 14:
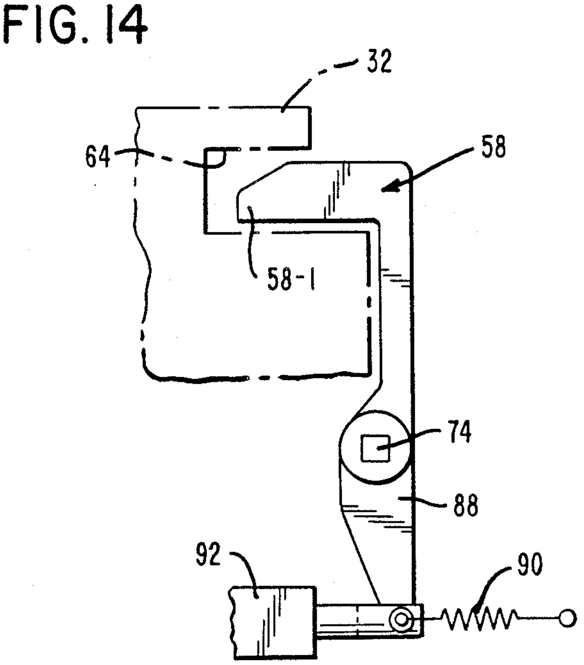
FIG. 14 is an end view taken along the line 14—14 of FIG. 2 to show a different means for moving the pocket marker between the positions shown in FIGS. 2 and 4.

FIG. 14 shows a second embodiment of the means for moving the pocket marker 58 between the positions shown in FIGS. 2 and 4. This second embodiment includes a lever 88 having one end fixed to the square shaft 74 to rotate it, with the remaining end secured to a tension spring 90 which biases the pocket marker 58 to the position shown in FIG. 2. When the control signal CS is issued from the controller 56, it is utilized to energize the solenoid 92 which moves the pocket marker 58 to the position shown in FIG. 4. When the solenoid is de-energized, the spring 90 returns the marker to the position shown in FIG. 2. The lower end 58-1 of the pocket marker 58 is shown positioned in the recess 64 of the side wall 32 to insure that all the documents associated with a transaction are moved towards the stack of documents for completed transactions as previously described.

A discussion of some additional miscellaneous points appear in order. As earlier stated herein, the spring 40 (FIG. 1) biases the pusher plate 38 towards the side wall 32. A dash pot 94 (shown on schematically in FIG. 1) is used, conventionally, to retard the motion of the pusher plate 38 as it is moved towards the side wall 32; this retarded return motion enables the operator to remove his or her hands from the pocket 18 after documents removed therefrom are returned thereto to the growing stack 60. The controller 56 (FIG. 1) also has a manually operated switch (SW) 96 associated therewith to enable the controller to issue a CS signal whenever the operator wants the device 54 to be actuated. For example, the operator may feel as though he or she made a mistake in entering the monetary amount of one check in a transaction which involved a large number of checks. In this situation, the device 54 "marks" the suspected document when the switch 96 is actuated. Also, the device 54 enables the operator to find a document which the operator would like to locate first.

What is claimed is:

1. A machine comprising:

a pocket for receiving documents processed by said machine;

processing means for processing said documents in accordance with predetermined criteria;

moving means for moving documents processed by said processing means into said pocket; and highlighting means for highlighting certain of said documents moved into said pocket in accordance with said predetermined criteria so as to facilitate the removal of said certain of said documents from said pocket.

2. The machine as claimed in claim 1 in which said highlighting means includes a pocket marker and moving means for moving said pocket marker between operative and inoperative positions with respect to documents moved into said pocket;

said pocket marker when in said operative position being effective to highlight said certain of said documents by separating them from the remaining documents which are not to be highlighted; and said pocket marker when in said inoperative position enabling said certain of said documents which have previously been highlighted to be joined with said remaining documents.

3. A pocket buffering device comprising:

a pocket for receiving documents to be pocketed; said pocket having a side wall, an end wall, and a moveable wall, and biasing means for moving said moveable wall towards said side wall;

said moveable wall being moved away from said side wall by documents being moved into said pocket to form an increasing stack of documents deposited in said pocket;

moving means for moving documents into said pocket to abut against said end wall to form said stack;

highlighting means for highlighting those of said documents which.have been moved into said pocket after a control signal has been generated; and means for generating said control signal.

4. The pocket buffering device as claimed in claim 3 in which said highlighting means includes means for facilitating the removal of those of said documents which have been moved into said pocket after said control signal has been generated.

5. The pocket buffering device as claimed in claim 4 in which said highlighting means includes a marker which physically identifies those of said documents which have been moved into said pocket after said control signal has been generated.

6. The pocket buffering device as claimed in claim 5 in which said highlighting means includes actuation means for moving said marker between first and second positions with regard to said pocket, said marker when in said first position being effective to separate those of said documents which have been moved into said pocket after said control signal has been generated from those of said documents, if any, which were in said pocket prior to the generation of said control signal;

said biasing means including a dashpot.

7. An encoder comprising:

a pocket for receiving documents to be pocketed; said pocket having a side wall, an end wall, and a moveable wall which is biased for movement towards said side wall and which is moved away from said side wall by documents being moved into said pocket to form an increasing stack of documents deposited in said pocket;

processing means for processing said documents in accordance with predetermined criteria;

moving means for moving documents processed by said processing means into said pocket to abut against said end wall to form said stack;

said processing means generating a control signal when a transaction group of said documents is proven; and highlighting means for highlighting those of said documents which have been moved into said pocket after a control signal has been generated to thereby facilitate the removal of those documents which are unproven.

8. The encoder as claimed in claim 7 in which said highlighting means includes means for facilitating the removal of those of said documents which have been moved into said pocket after said control signal has been generated.

9. The encoder as claimed in claim 8 in which said highlighting means includes a marker which physically identifies those of said documents which have been moved into said pocket after said control signal has been generated.

10. The encoder as claimed in claim 9 in which said highlighting means includes actuation means for moving said marker between first and second positions with regard to said pocket, said marker when in said first position being effective to separate those of said documents which have been moved into said pocket after said control signal has been generated from those of said documents, if any, which were in said pocket prior to the generation of said control signal.

11. The encoder as claimed in claim 10 in which said actuation means comprises:

a stationary cam;

a moveable cam;

a square shaft, and means for mounting said square shaft parallel to said end wall of said pocket;

said marker being mounted on said moveable cam for movement therewith, and said moveable cam being mounted on said square shaft to enable said said moveable cam to be axially moveable on said square shaft while being rotated by said square shaft;

resilient biasing means for biasing said moveable cam with said marker thereon towards said side wall; and means for rotating said square shaft between first and second positions;

said moveable and stationary cams cooperating to move said marker between said first and second positions when said square shaft is rotated between said first and second positions, respectively; and said resilient biasing means being effective to move said moveable cam with said marker thereon axially towards said side wall of said pocket as said moveable cam with said marker thereon approaches said second position so as to be in a position to move all the documents associated with a said transaction group towards said moveable wall of said pocket as said moveable cam with said marker thereon is moved to said first position by said rotating means.

12. The encoder as claimed in claim 11 in which said rotating means includes a rotary solenoid.

13. The encoder as claimed in claim 11 in which said rotating means includes a spring and link means to bias said square shaft towards said first position, and also includes an actuator to rotate said square shaft towards said second position in response to said control signal.

14. The encoder as claimed in claim 7 in which said processing means also includes a manually operated switch for issuing a said control signal.

15. A method of highlighting documents being moved into a pocket to form a stack of documents therein comprising the steps:

(a) moving documents associated with a transaction into said pocket;

(b) determining whether or not the documents associated with said transaction meet predetermined criteria;

(c) generating a control signal when associated with said transaction meet said predetermined criteria;

(d) using said control signal to effect a highlighting in said pocket of documents associated with the next transaction to be evaluated in step b so as to facilitate the grasping of documents in said pocket in the event that this next transaction does not meet said predetermined criteria.

16. The method as claimed in claim 15 in which said highlighting of step d is effected by positioning a marker in said pocket.

17. A method of highlighting documents being moved into a pocket to form a stack of documents therein comprising the steps:

(a) moving documents associated with a transaction into said pocket;

(b) determining whether or not the documents associated with said transaction meet predetermined criteria;

(c) generating a control signal when the documents associated with said transaction meet said predetermined criteria;

(d) using said control signal to effect a highlighting in said pocket of documents associated with the next transaction to be evaluated in step b so as to facilitate the grasping of documents in said pocket in the event that this next transaction does not meet said predetermined criteria.

18. A method of facilitating the proving or balancing of documents including deposit slips and checks at a business machine like an encoder, comprising the steps:

(a) processing a deposit slip and associated checks relating to a transaction to be proven;

(b) moving the deposit slip and associated checks into a pocket to form a stack therein;

(c) generating a control signal upon the satisfactory proving or balancing of the processing of a transaction performed at step a;

(d) using said control signal to highlight in said pocket the deposit slip and checks associated with the next transaction to be proven so as to facilitate grasping said deposit slip and checks from this step (d) in the event that this transaction is not proven.

19. The method as claimed in claim 18 in which said using step is effected by positioning a marker in said pocket in response to said control signal to separate the deposit slip and the checks associated with the next transaction to be proven from the deposit slips and checks, if any, from prior proven transactions.

20. The method of highlighting the documents in the pocket of an encoding machine which are associated with a transaction which is not proven comprising the steps:

(a) positioning a marker in said pocket to one side of a stack of documents which are associated with prior transactions which are proven;

(b) collecting the documents which are associated with a transaction to be proven on the remaining side of said marker so as to highlight the documents associated with this transaction to be proven from said stack of documents;

(c) removing said marker from said pocket upon a satisfactory control signal indicating that the documents associated with said transaction in step (b) are proven to enable these documents to become part of said stack of documents; and (d) re-positioning said marker at said one side of said stack.

21. A pocket buffering device for use with a machine which has a pocket for receiving documents processed by the machine, comprising:

a pocket marker;

moving means for moving said pocket marker between an active position and an inactive position with respect to documents which are moved into said pocket;

said pocket marker when in said active position being effective to separate into a first stack documents which are entering said pocket from those documents which are already in a second stack in said pocket, with the separating of documents into said first stack being determined according to predetermined criteria determined by said machine; and said pocket marker when moved to said inactive position by said moving means in response to a control signal from said machine enabling the documents in said first stack to become a part of said second stack.

* * * * *

UNITED STATES PATENT AND TRADEMARK OFFICE
CERTIFICATE OF CORRECTION

PATENT NO. : 4,786,786

DATED : November 22, 1988

INVENTOR(S) : Peter D. Hanna

It is certified that error appears in the above-identified patent and that said Letters Patent is hereby corrected as shown below:

Column 11, line 50, after the word "when" insert --the documents--.

Signed and Sealed this

Fourth Day of April, 1989

*Attest:*

DONALD J. QUIGG

*Attesting Officer*

*Commissioner of Patents and Trademarks*